United States Patent Office 2,739,893
Patented Mar. 27, 1956

2,739,893
PHOTOTHERMOGRAPHIC SUBSTANCES

Marilyn Levy, Red Bank, N. J., assignor to the United States of America as represented by the Secretary of the Army No Drawing. Application June 29, 1954,
Serial No. 440,305

4 Claims. (Cl. 95—7)

(Granted under Title 35, U. S. Code (1952), sec. 266)

The invention described herein may be manufactured and used by or for the Government for governmental purposes without the payment of any royalty thereon.

The invention relates to new photothermographic substances and to layers sensitized with the new photothermographic substances.

The term "photothermographic" has been defined in U. S. Patent 2,095,839 as characterizing a material which after its exposure to light may be decomposed or modified by the action of heat differentially in accordance with the exposure to light. A photographic layer sensitized with such photothermographic substances is therefore, after exposure to light, developable by heat.

The present invention is based on the discovery that the silver salts of thiosemicarbazide ($NH_2$—$NH$—$CS$—$NH_2$) are valuable photothermographic substances which will produce after exposure to light and subsequent to heat treatment a visible record of the incident light.

The invention will become more apparent from the following description of embodiments of the broad inventive idea:

EXAMPLE 1

1. *Preparation of silver thiosemicarbazide*

Dissolve 0.91 gram of thiosemicarbazide in 30 cc. distilled water on a steam bath; cool to 40° C. and add 10 ml. 1 N silver nitrate ($AGNO_3$). (It is preferable to add the 10 ml. of silver nitrate in about seven seconds.) Filter the resinous portion that drops out first and cool the filtrate for about five minutes in an ice bath. Filter the precipitate thus formed and wash with distilled water. The precipitate is then allowed to dry overnight in a vacuum desiccator over calcium chloride.

2. *Preparation of emulsion for coating*

Grind the dried silver thiosemicarbazide (prepared as above) in an agate mortar. Add 5 cc. of a 3 per cent gelatin solution at room temperature to 0.5 gram of the silver salt with agitation. When the silver salt is thoroughly wetted with the gelatin solution, the remaining gelatin is added (10 cc.). The emulsion is then passed through a stainless steel hand homogenizer and coated on clean glass slides. The slides were dried overnight and then exposed to a light source. Thermal development was carried out by placing the plate, emulsion-side up, in a Nichrome-wound aluminum block oven at 60° C.

EXAMPLE 2

*Preparation of emulsion of mixed silver salts of thiosemicarbazide and succindiamidoxime*

Add 5 cc. of a 3 per cent gelatin solution to a mixture of 0.25 gram silver succindiamidoxime (described in copending patent application Serial No. 440,308, filed June 29, 1954, by Marilyn Levy and Heinz Schulze on Photothermographic Substance) and 0.25 gram of silver thiosemicarbazide with agitation. Add another 10 cc. of the gelatin solution and pass through a hand homogenizer and coat on slides in an air-cooled atmosphere. Plates coated with this mixture are more light sensitive than either of the individual components. The plates are exposed to a light source and thermally developed at about 60° C.

The photothermographic substances according to the invention may be dispersed in any suitable colloidal carrier to produce a photothermographic layer on one of the conventional supports. The material for the photographic layer may consist of gelatin, casein, agar, and various natural or synthetic high polymers such as polystyrene or phenol formaldehyde resins, vinyl resins, alkyd resins, etc. The support for the photographic layer may be a plate of any of the commonly used materials such as glass, paper, cellulose derivatives, etc.

To prepare the mixed silver salts any amidoxime of an organic saturated dibasic acid having less than seven carbon atoms in the molecule may be used provided it is capable of decomposition at elevated temperatures with formation of metallic silver.

It will be obvious to those skilled in the art that a great many variations and combinations of the described processes are possible within the broad inventive idea as characterized in the appended claims.

What is claimed is:

1. A photothermographic element comprising an organic colloid carrier having dispersed therein the silver salt of thiosemicarbazide.

2. A photothermographic element comprising an organic colloid carrier having dispersed therein a mixture of silver succindiamidoxime and silver thiosemicarbazide.

3. A photothermographic element comprising a support and a photothermographic layer, said layer comprising an organic colloid carrier having dispersed therein silver thiosemicarbazide.

4. A photothermographic element comprising a support and a photothermographic layer, said layer comprising an organic colloid carrier having dispersed therein a mixture of silver thiosemicarbazide and silver succindiamidoxime.

References Cited in the file of this patent

UNITED STATES PATENTS 2,423,767    Fry et al. _____ July 8, 1947